(12) United States Patent
Nomoto (10) Patent No.: US 11,754,913 B2
(45) Date of Patent: Sep. 12, 2023

(54) COOLING APPARATUS HAVING REFRIGERANT FLOW GENERATOR AND LIGHT SOURCE APPARATUS AND IMAGE PROJECTION APPARATUS INCLUDING THE COOLING APPARATUS

(71) Applicant: CANON KABUSHIKI KAISHA, Tokyo (JP)

(72) Inventor: Makoto Nomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/215,663

(22) Filed: Mar. 29, 2021

(65) Prior Publication Data
US 2021/0318597 A1 Oct. 14, 2021

(30) Foreign Application Priority Data
Apr. 10, 2020 (JP) ................................ 2020-071332

(51) Int. Cl.
G03B 21/16 (2006.01)
(52) U.S. Cl.
CPC .................... *G03B 21/16* (2013.01)
(58) Field of Classification Search
CPC ............................. G03B 21/16; H04N 9/3144
See application file for complete search history.

(56) References Cited

U.S. PATENT DOCUMENTS

| | | | | |
|---|---|---|---|---|
| 6,172,416 B1* | 1/2001 | Miyahara | .............. | H01L 23/552 165/122 |
| 6,452,790 B1* | 9/2002 | Chu | .......................... | G06F 1/20 361/679.52 |
| 7,781,991 B2* | 8/2010 | Chou | ..................... | G03B 21/16 318/567 |
| 9,039,192 B2* | 5/2015 | Okazawa | ............. | H04N 9/3155 353/57 |
| 9,298,073 B2* | 3/2016 | Miyata | ................. | H04N 9/3155 |
| 9,983,466 B2* | 5/2018 | Fukuda | ................... | F21V 29/60 |

(Continued)

FOREIGN PATENT DOCUMENTS

| | | |
|---|---|---|
| JP | H10224061 A | 8/1998 |
| JP | 2004287190 A | 10/2004 |

(Continued)

*Primary Examiner* — Bao-Luan Q Le
(74) *Attorney, Agent, or Firm* — ROSSI, KIMMS & McDOWELL LLP (57) ABSTRACT

A cooling apparatus includes a heat transfer member configured to receive heat from a heating element, a first refrigerant flow generator and a second refrigerant flow generator each configured to generate a flow of a refrigerant for cooling the heat transfer member, a detector configured to acquire information on a temperature of the heating element, and a controller configured to control driving of the first and second refrigerant flow generators. The flow of the refrigerant generated by the first refrigerant flow generator passes closer to the heating element than the flow of the refrigerant generated by the second refrigerant flow generator. The controller stops the first refrigerant flow generator and drives the second refrigerant flow generator when the first refrigerant flow generator is being driven and the heating element is in a first state in which its temperature is lower than a predetermined range.

13 Claims, 4 Drawing Sheets

(56) References Cited

U.S. PATENT DOCUMENTS

| | | | |
|---|---|---|---|
| 10,004,158 B2* | 6/2018 | Abe | H05K 7/20145 |
| 11,156,906 B2* | 10/2021 | Wu | G03B 21/16 |
| 2009/0021946 A1* | 1/2009 | Nozaki | G02B 27/283 |
| | | | 362/296.01 |
| 2009/0120631 A1* | 5/2009 | Chou | G03B 21/16 |
| | | | 236/44 C |
| 2012/0229710 A1* | 9/2012 | Okazawa | H04N 9/3155 |
| | | | 348/748 |
| 2014/0111777 A1* | 4/2014 | Miyata | G03B 21/16 |
| | | | 353/57 |
| 2016/0270256 A1* | 9/2016 | Abe | H05K 7/20209 |
| 2017/0277027 A1* | 9/2017 | Fukuda | F28D 15/0275 |
| 2020/0133108 A1* | 4/2020 | Noda | G05D 23/1932 |
| 2020/0201151 A1* | 6/2020 | Wu | G03B 21/145 |
| 2020/0241401 A1* | 7/2020 | Sano | F04D 13/12 |
| 2021/0033952 A1* | 2/2021 | Dai | G03B 21/16 |
| 2022/0171263 A1* | 6/2022 | Wu | H05K 7/2039 |
| 2023/0072330 A1* | 3/2023 | Nakamori | H04N 9/3158 |

FOREIGN PATENT DOCUMENTS

| | | | |
|---|---|---|---|
| JP | 2007101897 A | | 4/2007 |
| JP | 2017138525 A | | 8/2017 |

\* cited by examiner

COOLING APPARATUS HAVING REFRIGERANT FLOW GENERATOR AND LIGHT SOURCE APPARATUS AND IMAGE PROJECTION APPARATUS INCLUDING THE COOLING APPARATUS

BACKGROUND OF THE INVENTION

Field of the Invention

The present invention relates to a cooling apparatus suitable to cool a light source apparatus used for an image projection apparatus, such as a projector.

Description of the Related Art

A heating element, such as a light source, is used for the projector, and often cooled by flowing a refrigerant (or coolant), such as air or liquid, through a heat transfer member, such as a heat sink or a heat pipe. In particular, a solid-state light source, such as a laser element and an LED, has a temperature characteristic in which a light emitting amount (luminance), emission wavelength, and life vary depending on the temperature and thus needs to be cooled so as to keep the temperature within a certain range. Japanese Patent Laid-Open No. 2017-138525 discloses a projector that disposes one of a plurality of solid-state light sources having a larger temperature characteristic near an intake port of a housing to facilitate the temperature control.

However, the projector disclosed in Japanese Patent Laid-Open No. 2017-138525 has difficulty in maintaining the temperature of the solid-state light source within a certain range when the environmental temperature changes or when the light emitting amount of the solid-state light source is changed by changing the electrification (voltage or current) amount.

SUMMARY OF THE INVENTION

The present invention provides a cooling apparatus, a light source apparatus, and an image projection apparatus, each of which can easily maintain a temperature of a heating element within a certain range.

A cooling apparatus according to one aspect of the present invention includes a heat transfer member configured to receive heat from a heating element, a first refrigerant flow generator and a second refrigerant flow generator each configured to generate a flow of a refrigerant for cooling the heat transfer member, a detector configured to acquire information on a temperature of the heating element, and a controller configured to control driving of the first and second refrigerant flow generators. The flow of the refrigerant generated by the first refrigerant flow generator passes closer to the heating element than the flow of the refrigerant generated by the second refrigerant flow generator. The controller stops the first refrigerant flow generator and drives the second refrigerant flow generator when the first refrigerant flow generator is being driven and the heating element is in a first state in which the temperature of the heating element is lower than a predetermined range. Alternatively, the controller stops the second refrigerant flow generator and drives the first refrigerant flow generator when the first refrigerant flow generator stops, the second refrigerant flow generator is being driven, and the temperature of the heating element is higher than a predetermined range.

A light source apparatus having the above cooling apparatus and an image projection apparatus having the above light source apparatus also constitute another aspect of the present invention. A control method of the above cooling apparatus also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
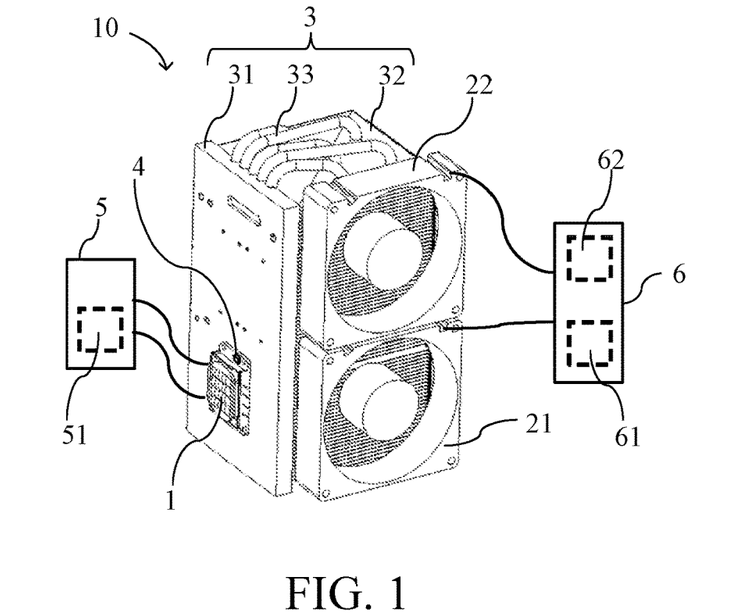
FIG. 1 is a perspective view of a light source unit according to a first embodiment of the present invention.

FIG. 1 illustrates a structure of a light source unit 10 as a light source apparatus including a cooling apparatus according to a first embodiment of the present invention. The light source unit 10 includes a laser diode (referred to as an LD hereinafter) 1 as a solid-state light source, a heat sink 3 as a heat transfer member, a first fan 21 as a first refrigerant flow generator, and a second fan 22 as a second refrigerant flow generator.

The LD 1 emits blue laser light (simply referred to as blue light hereinafter). The LD1 which is a heating element that emits heat as it emits light is fixed to a base member 31 of the heat sink 3 as the heat transfer member by screws. A heat transfer grease (not shown) is disposed between the LD 1 and the base member 31, whereby the heat generated from the LD 1 is transferred to the heat sink 3. The heat sink 3 includes the base member 31 described above, a fin member 32 made of a plurality of metal plates attached to the base member 31 and spaced in parallel with each other, and a heat pipe 33 that moves the heat locally generated from the LD 1 through the base member 31 to the fin member 32.

The LD 1 is attached to the base member 31 at a position biased to one side in a direction in which the metal plates of the fin member 32 are aligned (referred to as a fin alignment direction hereinafter) from the center of the base member 31. Each of the first fan 21 and the second fan 22 generates an airflow as a refrigerant. When the air flows along the fin member 32 of the heat sink 3, the heat efficiently dissipate from the heat sink 3. The first fan 21 and the second fan 22 are disposed on the upstream side of the heat sink 3, and the first fan 21 is located on the side where the LD 1 is disposed from the center of the heat sink 3 in the fin alignment direction. The second fan 22 is disposed on the side where the LD 1 is not disposed from the center of the heat sink 3 in the fin alignment direction. Due to this arrangement, the airflow generated by the first fan 21 passes closer to the LD 1 than the airflow generated by the second fan 22.

A temperature sensor 4 for detecting the temperature of the LD 1 is disposed near the LD 1. There are provided an output board 5 for adjusting the optical output of the LD 1, a current detector 51 for detecting an electrification amount (current amount) of the LD 1, and a fan controller 6 as a controller configured to control driving of the first and second fans 21 and 22. The temperature sensor 4, the current detector 51, and the outside air temperature sensor 8 described later are detectors for acquiring information on the temperature of the LD 1. The fan controller 6 acquires information on the temperature of the LD 1 using a detected value of at least one of the temperature sensor 4, the current detector 51, and the outside air temperature sensor 8 described later. The fan controller 6 includes a memory 61 that stores a set range (predetermined range) in which the acquired temperature of the LD 1 should be contained, and a rotation speed detector 62 that detects the rotation speeds of the first and second fans 21 and 22.

The cooling apparatus includes the heat sink 3, the first and second fans 21, the temperature sensor 4, the current detector 51, the outside air temperature sensor 8, and the fan controller 6.

In this embodiment, the first and second fans 21 and 22 are disposed on the upstream side of the heat sink 3, but they may be disposed on the downstream side of the heat sink 3.

Figure 2:
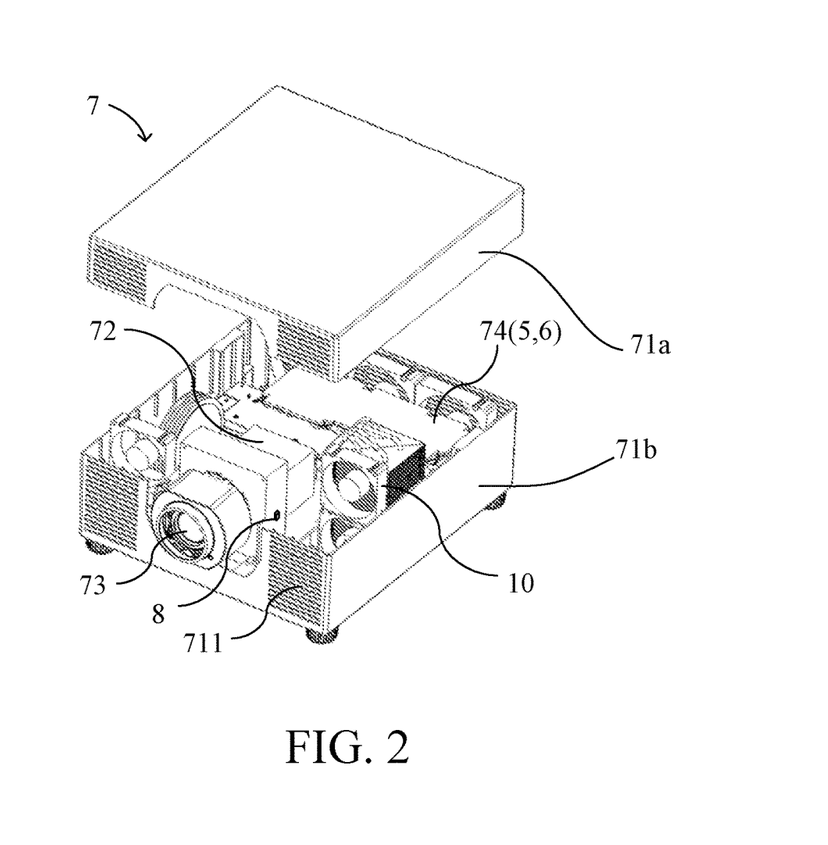
FIG. 2 is a perspective view of a projector using the light source unit.

FIG. 2 illustrates a projector 7 as an image projection apparatus including the light source unit 10 with its exterior cover 71*a* opened. The projector 7 includes the light source unit 10 disposed inside a housing 71*b* which is an exterior, an optical unit 72 as an image generator, a projection lens 73, and a substrate 74. The optical unit 72 includes a wavelength conversion element such as a phosphor that converts part of blue light from the light source unit 10 into yellow light, one or a plurality of liquid crystal panels as light modulation elements that modulate red light, green light, and blue light separated from yellow light, and a plurality of optical elements that guide light, separate colors, combine optical paths, and the like.

The projection lens 73 magnifies and projects the red, green, and blue image lights emitted from the liquid crystal panels in the optical unit 72, onto an unillustrated screen or the like. Thereby, the colored projection image is displayed. The substrate 74 controls driving of the projector 7 according to a video signal input from the outside.

The housing 71 includes an intake port 711 for taking in outside air. The outside air temperature sensor 8 that detects the temperature of the outside air is disposed near the intake port 711. When the first and second fans 21 and 22 are driven, the air flowing in from the intake port 711 flows along the fin member 32 of the heat sink 3.

Figure 3:
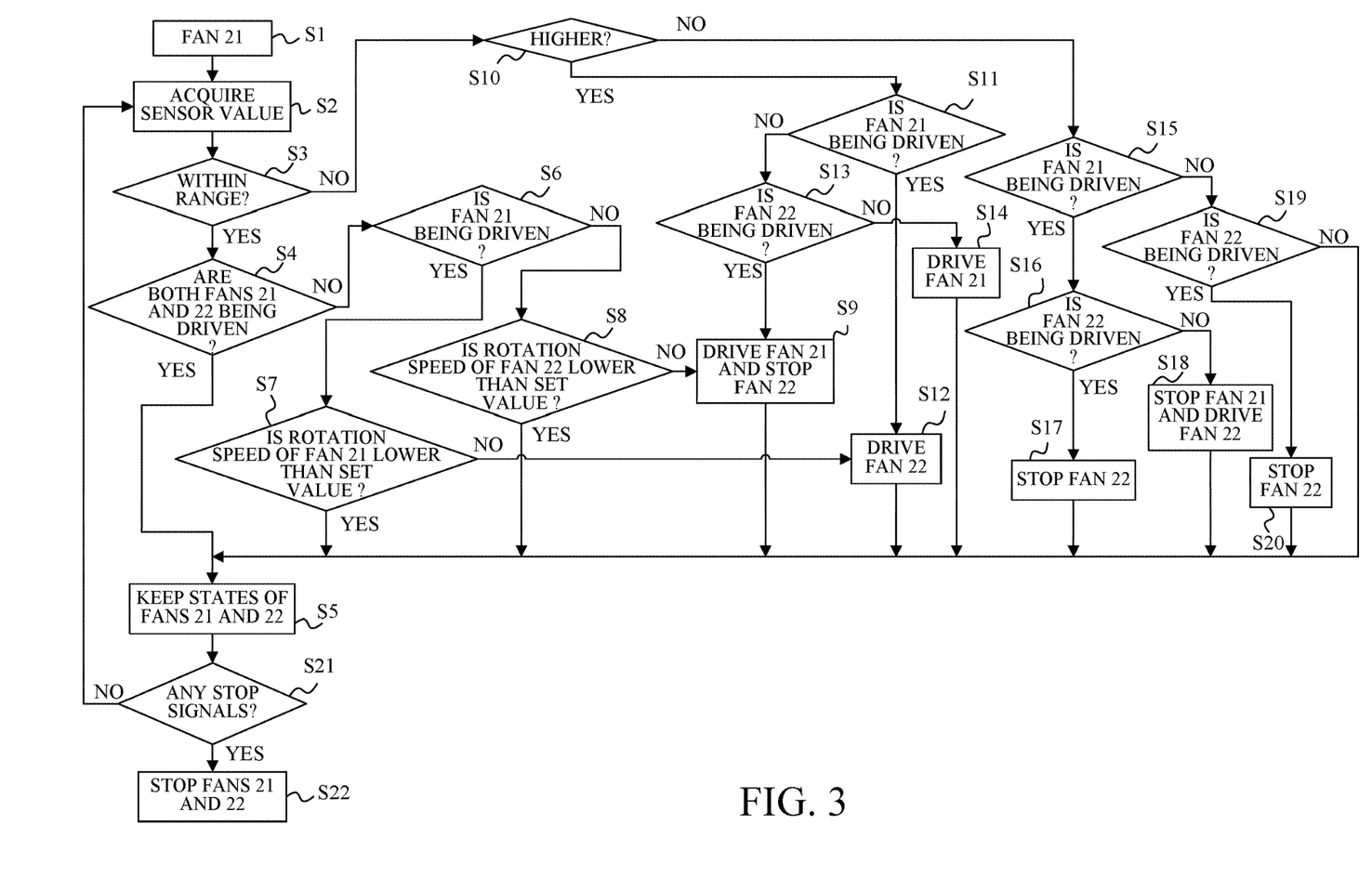
FIG. 3 is a flowchart showing cooling control processing according to the first embodiment.

A flowchart in FIG. 3 illustrates cooling control processing (control method) executed by the fan controller 6 to control the first and second fans 21 and 22. In the following description, S stands for the step. The fan controller 6, which is a computer such as a CPU, executes this processing according to a computer program.

In S1, the fan controller 6 drives the first fan 21. Next, in S2, the fan controller 6 acquires information of the temperature of the LD 1 (LD temperature hereinafter) using a detection value of at least one of the temperature sensor 4, the current detector 51, and the outside air temperature sensor 8. For example, the fan controller 6 acquires the LD temperature from the detected value of the temperature sensor 4. The calorific value (heating amount) of the LD 1 is calculated from the detected value of the current detector 51 and the energization time, and the LD temperature is acquired from the calorific value and the detected value of the outside air temperature sensor 8.

Then, in S3, the fan controller 6 determines whether or not the acquired LD temperature is within the set range stored in the memory 61, and if it is within the set range, the fan controller 6 proceeds to S4, and otherwise the fan controller 6 proceeds to S10.

In S4, the fan controller 6 determines whether or not both the first and second fans 21 and 22 are now being driven, and if both are being driven, the fan controller 6 proceeds to S5 and maintains the states of the first and second fans 21 and 22 (driving and its rotation speeds or stopping). On the other hand, when both are not driven, the fan controller 6 proceeds to S6 and determines whether or not the first fan 21 is being driven (the second fan 22 stops). The fan controller 6 proceeds to S7 when the first fan 21 is being driven, and otherwise proceeds to S8.

In S7, the fan controller 6 determines whether or not the current rotation speed of the first fan 21 is equal to or less than the set value (predetermined value) set from the viewpoint of noise reduction or the like, and if it is equal to or less than the set value, it proceeds to S5, otherwise proceeds to S12.

In S12, the fan controller 6 drives the second fan 22 in addition to the driving first fan 21. Then it proceeds to S5.

When the second fan 22 is being driven in S6 (the first fan 21 stops), the fan controller 6 proceeds to S8, and determines whether or not the current rotation speed of the second fan 22 is equal to or less than the set value, and if it is equal to or less than the set value, the fan controller 6 proceeds to S5, and otherwise proceeds to S9.

In S9, the fan controller 6 drives the first fan 21 and stops the second fan 22. Then the fan controller 6 proceeds to S5.

In S10, the fan controller 6 determines whether or not the LD temperature is higher (lower) than the set range, and if it is lower (in the first state), the fan controller 6 proceeds to S15 and if it is higher (in the second state), the fan controller 6 proceeds to S11.

In S11, the fan controller 6 determines whether or not the first fan 21 is being driven, and if it is being driven, the fan controller 6 proceeds to S12, and if it stops, the fan controller 6 proceeds to S13. In S12, the fan controller 6 drives the second fan 22 in addition to the first fan 21. Then, the fan controller 6 proceeds to S5.

In S13, the fan controller 6 determines whether or not the second fan 22 is driven, and if it is driven, proceeds to S9 to drive the first fan 21 and stop the second fan 22. Then proceed to S5. If the second fan 22 is stopped in S13, the fan controller 6 proceeds to S14 to drive the first fan 21. Then proceed to S5.

On the other hand, in S15, the fan controller 6 determines whether or not the first fan 21 is being driven, and if it is being driven, the fan controller 6 proceeds to S16, and if it stops, the fan controller 6 proceeds to S19. In S16, the fan controller 6 determines whether or not the second fan 22 is being driven, and if it is being driven, the fan controller 6 proceeds to S17, and if it stops, the fan controller 6 proceeds to S18.

In S17, the fan controller 6 continues to drive the first fan 21 and stops the second fan 22. Alternatively, the fan controller 6 may continue to drive the second fan 22 and stop the first fan 21. Then, the fan controller 6 proceeds to S5.

In S18, the fan controller 6 stops the first fan 21 and starts driving the second fan 22. Then, the fan controller 6 proceeds to S5.

In S19, the fan controller 6 determines whether or not the second fan 22 is being driven, and if it is being driven, the fan controller 6 proceeds to S20, and if it stops, the fan controller 6 proceeds to S5. In S20, the fan controller 6 stops the second fan 22. Then, the fan controller 6 proceeds to S5.

In S21 following S5, the fan controller 6 detects whether or not a stop signal that instructs the first and second fans 21 and 22 to stop has been input, and if the stop signal has not been input, the fan controller 6 returns to S2. If the stop signal has been input, the fan controller 6 proceeds to S22. In S22, the fan controller 6 stops the first and second fans 21 and 22.

Figure 4:
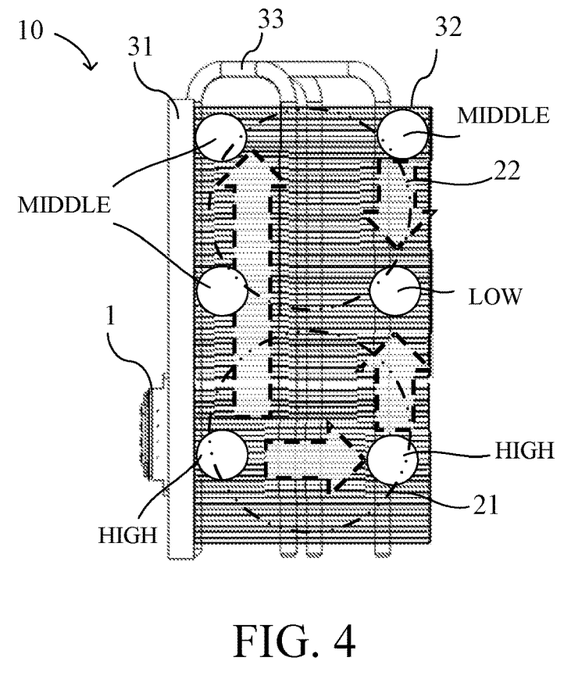
FIG. 4 is a temperature distribution diagram of a heat sink used for the light source unit.

FIG. 4 illustrates the temperature distribution of the heat sink 3 when the LD 1 is lit. The temperature of the heat sink 3 is distributed so that the temperature of the side of the heat sink 3 where the LD 1 is biased is higher (high) than the temperature of the central part in the fin alignment direction, and the temperature of the side where the LD1 is not disposed is lower (middle), but the central part is even lower (medium to low). Since the airflow from the first fan 21 passes closer to the LD 1 than the airflow from the second fan 22 with respect to the heat sink 3 having such a temperature distribution, the cooling effect of the first fan 21 is higher than that of the second fan 22. The cooling effect of the fan can be evaluated by the temperature rise amount represented by the following expression 1, and the smaller the temperature rise amount is, the higher the cooling effect is.

$$\text{Temperature rise amount } [W] = \text{Calorific value } [W] \times$$
$$\text{Thermal resistance } [°C/W] \text{Thermal resistance } [°C/W] =$$
$$\frac{1}{\text{Heat transfer area } [m^2] \times \text{Thermal conductivity } [W/m^2°C]} =$$
$$\left( \text{Thermal conductivity } [W/m^2°C] = 3.86 \times \sqrt{\frac{\text{flow rate } [m/s]}{\text{length of flow } [m]}} \right)$$

From the above expression 1, the cooling effect is reduced even if the rotation speed of one fan is increased to increase the airflow amount (increasing the flow rate). However, the cooling effect can be improved by driving a plurality of fans (21, 22) to widen the heat transfer area as in this embodiment.

When the LD temperature becomes too high even if the rotation speed of the first fan 21 is increased in a case where the light amount emitted from the LD 1 (or the electrification amount) is large and the calorific value from the LD 1 is large or the ambient temperature (outside air temperature) of the projector 7 is high, the second fan 22 is also driven while the first fan 21 is driven by suppressing the rotation speed of the first fan 21. Thereby, the LD temperature can be easily maintained within the set range without increasing the noise, and the upper limit of the range in which the LD temperature can be maintained constant can be made higher.

On the other hand, in a case where the light amount emitted from the LD1 is small and the calorific value is small or the ambient temperature of the projector is low, the LD temperature may be too low even if the rotation speed of the first fan 21 is lowered to the lower limit, and the LD temperature may be too high when the first fan 21 is stopped. In such a case, this embodiment stops the first fan 21 and drives the second fan 22 having a lower cooling effect. Thereby, the LD temperature can be easily kept within the set range, and the lower limit of the range in which the LD temperature can be kept constant can be made lower.

In this way, widening the range in which the LD temperature can be kept constant can suppress the color shift and contrast deterioration of the projected image caused by the wavelength shift of the LD 1 due to the temperature and a change in an excitation light amount incident on the wavelength conversion element. That is, the image quality deterioration of the projected image can be suppressed in various installation environments and usage environments.

In addition, the rotation speed of the fan can be made lower by driving both the first and second fans 21 and 22 rather than by driving a single fan in order to obtain the same cooling effect, and the noise reduction effect can be stronger. Moreover, driving the first fan 21 having a higher cooling effect and stopping the second fan 22 can more effectively suppress noises than driving only the second fan 22 at a high rotation speed.

Second Embodiment

Figure 5:
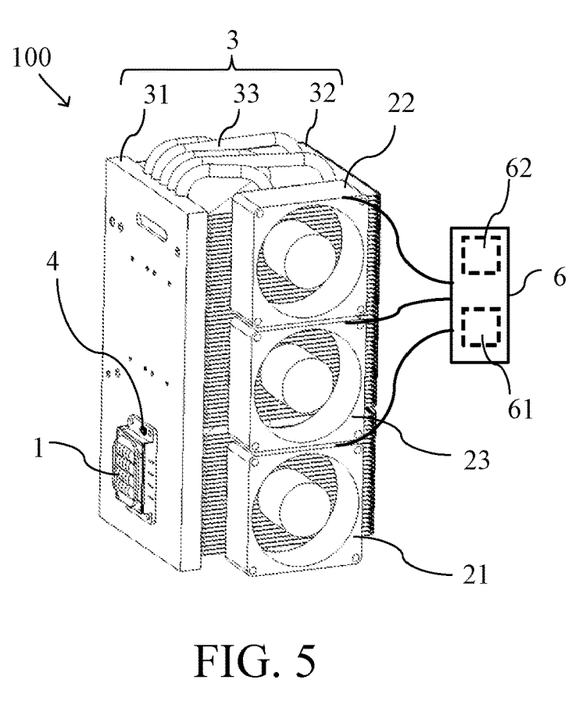
FIG. 5 is a perspective view of a light source unit according to a second embodiment of the present invention.

FIG. 5 illustrates a structure of a light source unit 100 including a cooling apparatus according to a second embodiment of the present invention. In this embodiment, the components common to those in the first embodiment will be designated by the same reference numerals as those in the first embodiment.

The light source unit 100 includes the LD 1, the heat sink 3, the first fan 21, and the second fan 22, similar to the first embodiment, and further includes a third fan 23.

Similar to the first embodiment, the LD 1 is attached to the base member 31 of the heat sink 3 at a position biased to one side in the fin alignment direction with respect to the center thereof. The first, second, and third fans 21, 22, and 23 are disposed on the upstream side of the heat sink 3. Similar to the first embodiment, the first fan 21 is disposed on the side where the LD1 is disposed and the second fan 22 is disposed on the side where the LD1 is not disposed with respect to the center of the heat sink 3 in the fin alignment direction. The third fan 23 is disposed between the first fan 21 and the second fan 22. The temperature sensor 4 is attached near the LD 1.

The temperature distribution of the heat sink 3 when the LD1 is lit is the same as that illustrated in FIG. 4. Since the airflow from the first fan 21 passes closer to LD 1 than the airflow from the second fan 22 also in this embodiment, the cooling effect of the first fan 21 is higher than that of the second fan 22. Since the airflow from the third fan 23 passes through a region of the heat sink 3 having the lowest temperature, the cooling effect of the third fan 23 is lower than that of the second fan 22.

Similarly, in this embodiment, when the LD temperature is too high even if the rotation speed of the first fan 21 is increased in a case where the light amount emitted from the LD 1 is large and the calorific value from the LD 1 is large or the ambient temperature (outside air temperature) of the projector 7 is high, at least one of the second fan 22 and the third fan 23 is driven while the first fan 21 is driven by suppressing the rotation speed of the first fan 21. In this case, the second and third fans 22 and 23 correspond to the second refrigerant flow generator. Thereby, the LD temperature can be easily kept within the set range without increasing the noise, and the upper limit of the range in which the LD temperature can be kept constant can be made higher.

Similarly, in this embodiment, when the LD temperature becomes too low even if the rotation speed of the first fan 21 is lowered to the lower limit in a case where the output of the LD1 is low and the calorific value is low or the ambient temperature of the projector is low, the first fan 21 is stopped and the second fan 22 is driven. Moreover, when the LD temperature is still too low, this embodiment stops the second fan 22 and drives the third fan 23. In this case, the second fan 22 corresponds to the first refrigerant flow generator, and the third fan 23 corresponds to the second refrigerant flow generator. Thereby, the LD temperature can be easily kept within the set range, and the lower limit of the range in which the LD temperature can be kept constant can be made lower.

Using three or more fans as in this embodiment can miniaturize each fan and increase the number of combinations of fans to drive and stop, so that the projector can be made smaller and the design freedom can be improved.

Third Embodiment

Figure 6:
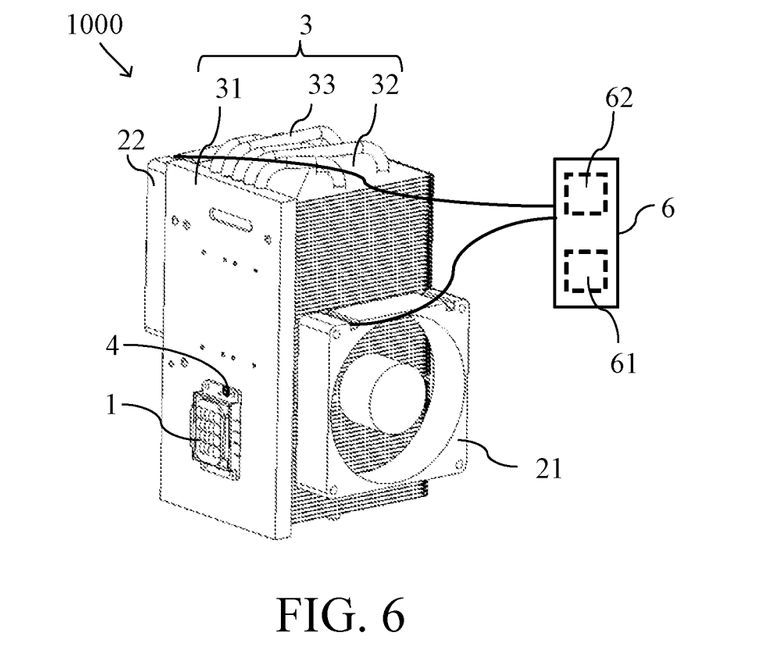
FIG. 6 is a perspective view of a light source unit according to a third embodiment of the present invention.
Figure 7:
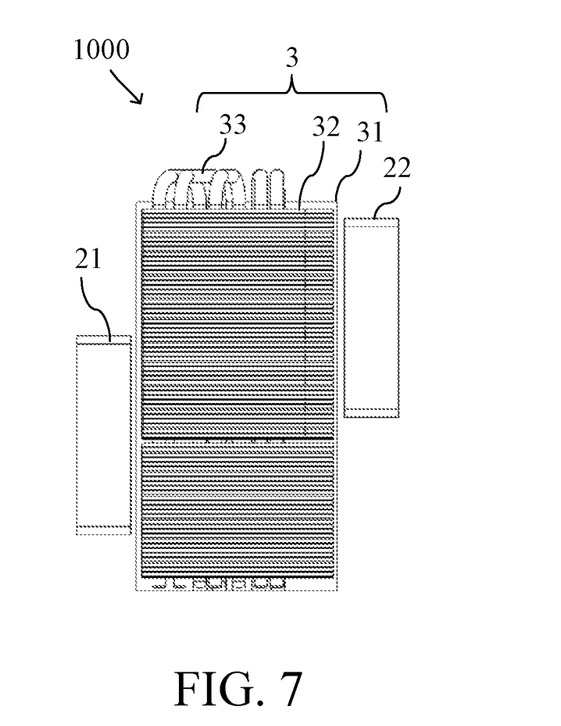
FIG. 7 is a rear view of a heat sink used for the light source unit according to the third embodiment.

FIGS. 6 and 7 illustrate a structure of a light source unit 1000 including a cooling apparatus according to a third embodiment of the present invention. In this embodiment, the components common to those in the first embodiment will be designated by the same reference numerals as those in the first embodiment.

The light source unit 1000 includes the LD1, the heat sink 3, the first fan 21, and the second fan 22, similar to the first embodiment. The LD1 is attached to the base member 31 of the heat sink 3 at a position biased toward one side in the fin alignment direction with respect to the center thereof. The temperature sensor 4 is attached near the LD 1.

In this embodiment, the first fan 21 is mostly disposed on the side of the heat sink 3 where the LD1 is disposed in the fin alignment direction, and most of the second fan 22 is mostly disposed on the side of the heat sink 3 where the LD1 is not disposed in the fin alignment direction. In this embodiment, the first fan 21 is disposed on the upstream side of the heat sink 3, and the second fan 22 is disposed on the downstream side of the heat sink 3. As illustrated in FIG. 7, part of the arrangement area of the first fan 21 and part of the arrangement area of the second fan 22 overlap each other in the fin alignment direction.

The temperature distribution of the heat sink 3 when the LD1 is lit is the same as that illustrated in FIG. 4. Since the airflow from the first fan 21 passes closer to LD1 than the airflow from the second fan 22 also in this embodiment, the cooling effect of the first fan 21 is higher than that of the second fan 22. The control over the first and second fans 21 and 22 is the same as that in the first embodiment.

This embodiment introduces part of the airflow from the first fan 21 into the second fan 22. Therefore, the flow rate in the expression 1 described in the first embodiment can be increased, and the cooling effect can be improved. Moreover, depending on the rotation speed of the first fan 21 and the overlapping range of the first and second fans 21 and 22 in the fin alignment direction, the cooling effect can be made lower than that when only the second fan 22 is disposed. Therefore, the range in which the LD temperature can be kept constant can be made wider.

The first fan 21 may be disposed on the downstream side of the heat sink 3, and the second fan 22 may be disposed on the upstream side of the heat sink 3.

In each of the above embodiments, the refrigerant is air and the refrigerant flow generator is a fan, but a liquid may be used as the refrigerant and a pump may be used as the refrigerant flow generator.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of the above embodiments can easily maintain the temperature of the heating element within a certain range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-071332, filed on Apr. 10, 2020 which is hereby incorporated by reference herein in its entirety.

What is claimed is:

1. A cooling apparatus comprising:
a heat transfer member configured to receive heat from a heating element;
a first refrigerant flow generator and a second refrigerant flow generator each configured to generate a flow of a refrigerant for cooling the heat transfer member;
a detector configured to acquire information on a temperature of the heating element; and
a controller configured to control driving of the first and second refrigerant flow generators,
wherein each of the first refrigerant flow generator and the second refrigerant flow generator faces the heat transfer member, and the flow of the refrigerant generated by the first refrigerant flow generator passes closer to the heating element than the flow of the refrigerant generated by the second refrigerant flow generator,
wherein the controller is configured to acquire the temperature of the heating element using the information acquired by the detector, and
wherein when the temperature of the heating element is lower than a predetermined detection range and the first refrigerant flow generator is being driven, the controller is configured to provide control such that the first refrigerant flow generator is stopped and the second refrigerant flow generator is driven; and
wherein when the temperature of the heating element is higher than the predetermined detection range and the first refrigerant flow generator is not being driven, the controller is configured to provide control such that the second refrigerant flow generator is not driven and the first refrigerant flow generator is driven.

2. The cooling apparatus according to claim 1, wherein when the first refrigerant flow generator is being driven, the second refrigerant flow generator is not being driven, and the temperature of the heating element is lower than the predetermined detection range, the controller is configured to provide control such that the first refrigerant flow generator is stopped and the second refrigerant flow generator is driven.

3. The cooling apparatus according to claim 1, wherein when the first and second refrigerant flow generators are being driven and the temperature of the heating element is lower than the predetermined detection range, the controller is configured to provide control such that the controller stops the second refrigerant flow generator and continues to drive the first refrigerant flow generator.

4. The cooling apparatus according to claim 1, wherein the detector detects the temperature of the heating element.

5. The cooling apparatus according to claim 1, wherein the detector detects an electrification amount supplied to the heating element.

6. The cooling apparatus according to claim 1, wherein the detector detects an outside air temperature of the cooling apparatus.

7. The cooling apparatus according to claim 1, wherein the heat transfer member includes a fin member, and
wherein each of the first and second refrigerant flow generators includes a fan configured to generate an airflow as the refrigerant.

8. The cooling apparatus according to claim 7, wherein the heat transfer member includes a heat pipe configured to guide heat from the heating element to the fin member.

9. The cooling apparatus according to claim 1, wherein when the first refrigerant flow generator is being driven and the temperature of the heating element is higher than the predetermined detection range, the controller is configured to provide control such that the first and second refrigerant flow generators are driven.

10. A light source apparatus comprising:
the cooling apparatus according to claim 1; and
a light source as the heating element.

11. An image projection apparatus comprising:
the light source apparatus according to claim 10; and
a light modulation element configured to modulate light from the light source, wherein the image projection apparatus projects image light from the light modulation element.

12. A control method of a cooling apparatus that includes a first refrigerant flow generator and a second refrigerant flow generator each configured to generate a flow of a refrigerant for cooling a heat transfer member configured to receive heat from a heating element, each of the first refrigerant flow generator and the second refrigerant flow generator facing the heat transfer member, the flow of the refrigerant generated by the first refrigerant flow generator passing closer to the heating element than the flow of the refrigerant generated by the second refrigerant flow generator, the control method comprising the steps of:
acquiring information on a temperature of the heating element;
acquiring the temperature of the heating element using the information; and
providing control,
wherein when the temperature of the heating element is lower than a predetermined detection range and the first refrigerant flow generator is being driven, the control is such that the first refrigerant flow generator is stopped and the second refrigerant flow generator is driven; and
wherein when the temperature of the heating element is higher than the predetermined detection range and the first refrigerant flow generator is not being driven, the control is such that the second refrigerant flow generator is not driven and the first refrigerant flow generator is driven.

13. A non-transitory computer-readable storage medium storing a computer program that causes a computer to execute the control method according to claim 12.

* * * * *